United States Patent
Khanna

(10) Patent No.: US 9,597,596 B2
(45) Date of Patent: Mar. 21, 2017

(54) LOCATION-BASED ACHIEVEMENTS FRAMEWORK

(71) Applicant: Zynga Inc., San Francisco, CA (US)

(72) Inventor: Nishchaie Khanna, San Mateo, CA (US)

(73) Assignee: Zynga Inc., San Francisco, CA (US)

( * ) Notice: Subject to any disclaimer, the term of this patent is extended or adjusted under 35 U.S.C. 154(b) by 326 days.

(21) Appl. No.: 14/336,516

(22) Filed: Jul. 21, 2014

(65) Prior Publication Data

US 2016/0016081 A1  Jan. 21, 2016

(51) Int. Cl.
*A63F 13/65* (2014.01)
*A63F 13/216* (2014.01)

(52) U.S. Cl.
CPC ............ *A63F 13/65* (2014.09); *A63F 13/216* (2014.09)

(58) Field of Classification Search
USPC ........................................ 463/30, 39, 40, 42
See application file for complete search history.

(56) References Cited

U.S. PATENT DOCUMENTS

| | | | |
|---|---|---|---|
| 2013/0004932 A1* | 1/2013 | Mahajan | G09B 7/02 434/362 |
| 2013/0262203 A1* | 10/2013 | Frederick | G06Q 30/0209 705/14.12 |

OTHER PUBLICATIONS

"Achievement (video gaming)", Wikipedia, [Online]. Retrieved from the Internet: <URL: http://en.wikipedia.org/wiki/Achievement_(video_gaming), (Accessed Jun. 20, 2014), 3 pgs.
Wick, Doug, "Your App's Location Awareness: Micro or Macro?", The Mobile Retail Blog, [Online]. Retrieved from the Internet: <URL: http://www.themobileretailblog.com/in-store-shopper-marketing/app-location-awareness-micro-macro/, (Accessed Jun. 23, 2014), 3 pgs.

* cited by examiner

*Primary Examiner* — Paul A D'Agostino
*Assistant Examiner* — Brandon Gray
(74) *Attorney, Agent, or Firm* — Schwegman Lundberg & Woessner, P.A.

(57) ABSTRACT

A method of encouraging actions by users with respect to a game networking system is disclosed. An indication of a presence of a user of a game networking system at a physical location is received. An opportunity for the user to perform an action within a game associated with the game networking system to obtain an achievement pertaining to the game is identified. The availability of the opportunity is triggered based on the presence of the user at the physical location. A notification to the user of information pertaining to the opportunity is communicated.

17 Claims, 11 Drawing Sheets ant, go to a virtual store to buy/sell virtual items, and the like. A player character in an online poker game may be able to play at specific tables, place bets of virtual currency for certain amounts, play or fold certain hands, play in a online poker tournament, and so forth.

LOCATION-BASED ACHIEVEMENTS FRAMEWORK

TECHNICAL FIELD

The present application relates generally to the technical field of location-based services, and, in one specific example, to encouraging participation in computer-implemented games by generating location-based incentives pertaining to the games.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

In many computer games, there are various types of in-game actions that a player character can make within the game. For example, a player character in an online role-playing game may be able to interact with other player characters, build a virtual house, attack enemies, go on a quest, go to a virtual store to buy/sell virtual items, and the like. A player character in an online poker game may be able to play at specific tables, place bets of virtual currency for certain amounts, play or fold certain hands, play in a online poker tournament, and so forth.

BRIEF DESCRIPTION OF THE DRAWINGS

Some embodiments are illustrated by way of example and not limitation in the figures of the accompanying drawings.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

In various embodiments, a method of encouraging actions by users with respect to a game networking system is disclosed. An indication of a presence of a user of a game networking system at a physical location is received. An opportunity for the user to perform an action within a game associated with the game networking system to obtain an achievement pertaining to the game is identified. The availability of the opportunity is triggered based on the presence of the user at the physical location. A notification to the user of information pertaining to the opportunity is communicated.

This method and other methods or embodiments disclosed herein may be implemented as a computer system having one or more modules (e.g., hardware modules or software modules). Such modules may be executed by one or more processors of the computer system. This method and other methods or embodiments disclosed herein may be embodied in instructions stored on a machine-readable medium that, when executed by one or more processors, cause the one or more processors to perform operations according to the instructions.

Figure 1:
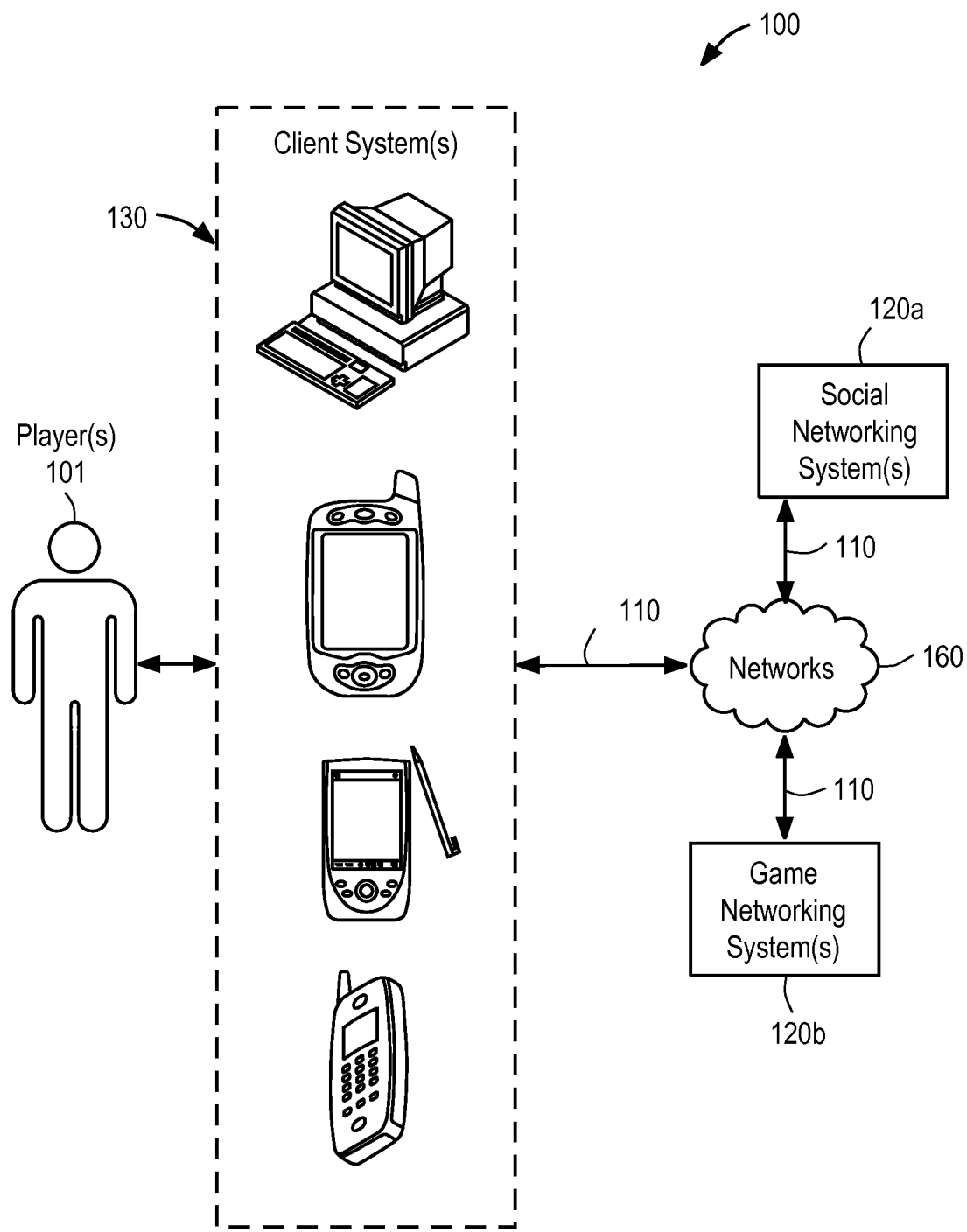
FIG. 1 is a block diagram illustrating an example of a system for implementing various disclosed embodiments.

FIG. 1 is a block diagram illustrating an example of a system 100 for implementing various disclosed embodiments. In particular embodiments, system 100 comprises player(s) 101, social networking system(s) 120a, game networking system(s) 120b, client system(s) 130, and networks 160. The components of system 100 can be connected to each other in any suitable configuration, using any suitable type of connection. The components may be connected directly or over a networks 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, and the like.

Although FIG. 1 illustrates a particular number of players 101, social networking systems 120a, game networking systems 120b, client system(s) 130, and networks 160, this disclosure contemplates any suitable number of player(s) 101, social networking system(s) 120a, game networking system(s) 120b, client system(s) 130, and networks 160. As an example and not by way of limitation, system 100 may include one or more game networking system(s) 120b and no social networking system 120a. As another example and not by way of limitation, system 100 may include a system that comprises both social networking system 120a and game networking system 120b. Moreover, although FIG. 1 illustrates a particular arrangement of player(s) 101, social networking system(s) 120a, game networking system(s) 120b, client system(s) 130, and networks 160, this disclosure contemplates any suitable arrangement of player(s) 101, social networking system(s) 120a, game networking system(s) 120b, client system(s) 130, and networks 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each includes one or more of an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections 110 between player (s) 101, social networking system(s) 120a, game networking system(s) 120b, client system(s) 130, and networks 160, this disclosure contemplates any suitable connections 110 between player(s) 101, social networking system(s) 120a, game networking system(s) 120b, client system(s) 130, and networks 160. As an example and not by way of limitation, in particular embodiments, client system(s) 130 may have a direct connection to social networking system(s) 120a or game networking system(s) 120b, thereby bypassing networks 160.

Online Games and Game Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including NPCs and in-game objects. The game engine also manages game state, including player character state for currently active (online) and inactive (offline) players.

An online game can be hosted by game networking system 120b, which can be accessed using any suitable connection with a suitable client system 130. A player 101 may have a game account on game networking system 120b, wherein the game account can contain a variety of information associated with the player 101 (e.g., the player's personal information, financial information, purchase history, player character state, game state, etc.). In some embodiments, a player 101 may play multiple games on game networking system 120b, which may maintain a single game account for the player 101 with respect to all the games, or multiple individual game accounts for each game with respect to the player 101. In some embodiments, game networking system 120b can assign a unique identifier to each player 101 of an online game hosted on game networking system 120b. Game networking system 120b can determine that a player 101 is accessing the online game by reading the user's cookies, which may be appended to Hypertext Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 120a, or game networking system 120*b*). As an example and not by way of limitation, client system 130 can download client components of an online game, which are executed locally, while a remote game server, such as game networking system 120*b*, provides backend support for the client components and may be responsible for maintaining application data of the game, processing the inputs from the player 101, updating and/or synchronizing the game state based on the game logic and each input from the player 101, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120*b*.

Game Systems, Social Networks, and Social Graphs

In an online multiplayer game, players may control player characters (PCs) and a game engine controls non-player characters (NPCs) and game features. The game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges connecting a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 120a or game networking system 120b). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game networking system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
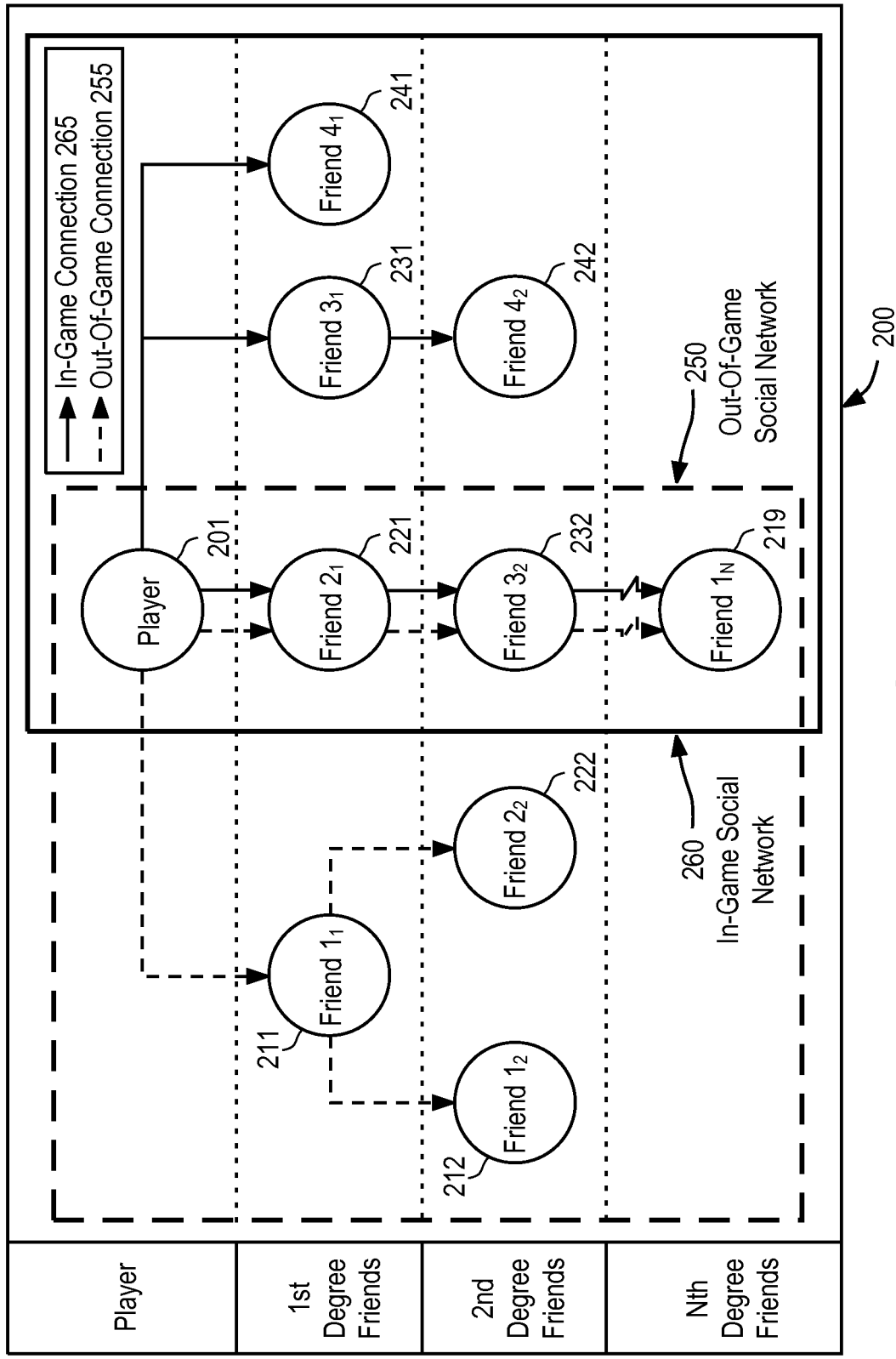
FIG. 2 is a block diagram illustrating an example of a social network within a social graph.

FIG. 2 is a block diagram illustrating an example of a social network 200 within a social graph. As shown, Player 201 can be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration and not by way of limitation, the details of out-of-game social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). In various embodiments, each edge required to connect a player to another user is considered the degree of separation. For example, FIG. 2 shows that Player 201 has three second-degree friends to whom he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260, and friend $4_2$ 242 is a second-degree friend with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out-of-game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access an in-game social network 260, out-of-game social network 250, or both.

In particular embodiments, the connections in a player's in-game social network can be formed both explicitly (e.g., when users "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Game Systems

A game event may be an outcome of an engagement, a provision of access, rights and/or benefits, or the obtaining of some assets (e.g., health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., plant a crop, clean a stove), complex tasks (e.g., build a farm or business, run a café), or other events.

An online game can be hosted by game networking system 120b, which can be accessed over any suitable network with an appropriate client system 130. A player 101 may have a game system account on game networking system 120b, wherein the game system account can contain a variety of information about the player 101 (e.g., the player's personal information, player character state, game state, etc.). In various embodiments, an online game can be embedded into a third-party website. The game can be hosted by the networking system of the third-party website, or it can be hosted on game networking system 120b and merely accessed via the third-party website. The embedded online game can be hosted solely on a server of game networking system 120b or using a third-party vendor server. In addition, any combination of the functions of the present disclosure can be hosted on or provided from any number of distributed network resources. For example, one or more executable code objects that implement all or a portion of the game can be downloaded to a client system for execution.

Virtual Currency

In various embodiments, players within the game can acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. In some embodiments, a player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

In some embodiments, virtual currency can be used to purchase one or more in-game assets or other benefits. For example, a player may be able to exchange virtual currency for a desired level, access, right, or item in an online game. In one embodiment, legal currency can be used to directly purchase an in-game asset or other benefit. The player can select the desired in-game asset or other benefit. Once appropriate selections are made, the player can place the order to purchase the in-game asset or other benefit. This order is received by the game networking system 120b, which can then process the order. If the order is processed successfully, an appropriate financial account associated with the player can be debited by the amount of virtual currency or legal currency needed to buy the selected in-game asset or other benefit.

In some embodiments, multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. In some implementations, virtual cash may also be awarded for leveling up in the game.

Figure 3:
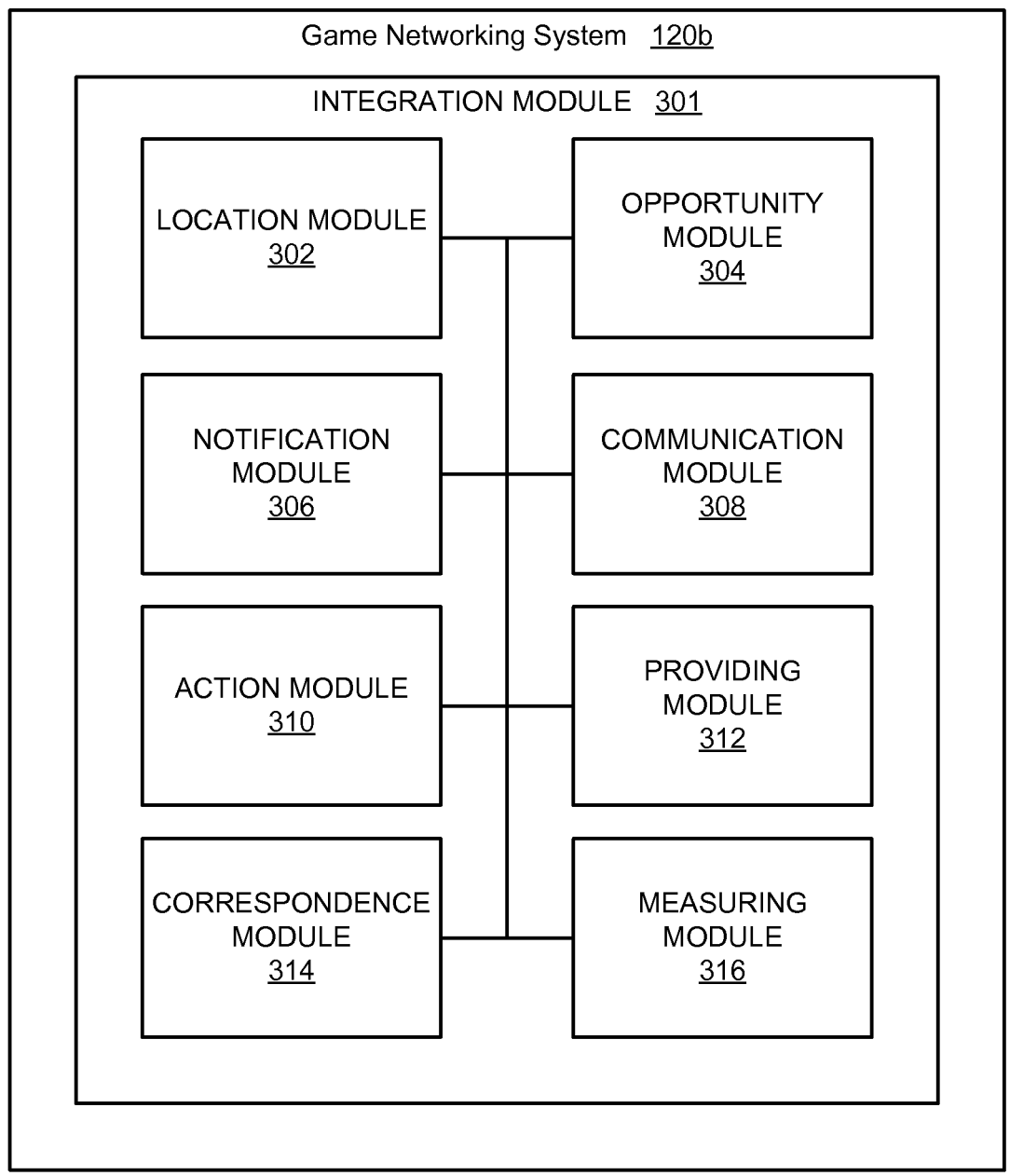
FIG. 3 is a block diagram illustrating example modules of the game networking system of FIG. 1.

FIG. 3 is a block diagram illustrating example modules of the game networking system of FIG. 1. An integration module 301 may be configured to integrate location-based achievements into the game networking system. A location module 302 may be configured to determine a presence of a user at a location (e.g., based on data received from a device of the user, such as GPS data). An opportunity module 304 may be configured to identify opportunities for a user to earn a location-based achievement. For example, based on the detecting of the user at a location, the opportunity module may access a database of information pertaining to location-based achievements associated with the location. A notification module 306 may be configured to generate notifications including information pertaining to location-based achievements for communication to the user. A communication module 308 may be configured to send and receive communications (e.g., between the game networking system and a device of the user). An action module 310 may be configured to determine whether a user has performed one or more actions required to earn a location-based achievement. A providing module 312 may be configured to provide a user with an achievement based on the requirements for the achievement being satisfied. A correspondence module 314 may be configured to determine a correspondences between achievements, locations, and games. A measuring module 316 may be configured to measure the effects on a user population of offering location-based achievements to users, such as effects on usage of the game networking system, advertising revenues collected by the game networking system, and sales revenues collected by the game networking system.

Location-Based Achievements

An achievement (also known as a trophy, badge, aware, stamp, medal, among other things) may be a meta-goal defined outside the parameters of a single game or outside the parameters of multiples games associated with the game networking system 120b. In various embodiments, an achievement may be an arbitrary challenge laid out by an administrator of the game networking system (or developer of a game executing on the game networking system) to be met by a player. In various embodiments, achievements may be visible outside the game environment (e.g., a visual representation on an online profile associated with the player). In various embodiments, the achievement may be provided independently of any additional reward (e.g., unlocking a game feature or providing the player with a virtual item that a player character of the player may equip). Achievements may thus prolong a player's enjoyment of a game.

In various embodiments, the game networking system may measure the effect of offering achievements to players with respect to various performance metrics, such as whether the achievements increase a number of daily active users with respect to the game networking system, increase a level of participation (e.g., a number of actions performed) by users with respect to the game networking system, increase revenues earned by the network gaming system (e.g., sales of virtual items, collections of transaction fees, or collections of advertising revenue).

Figure 4:
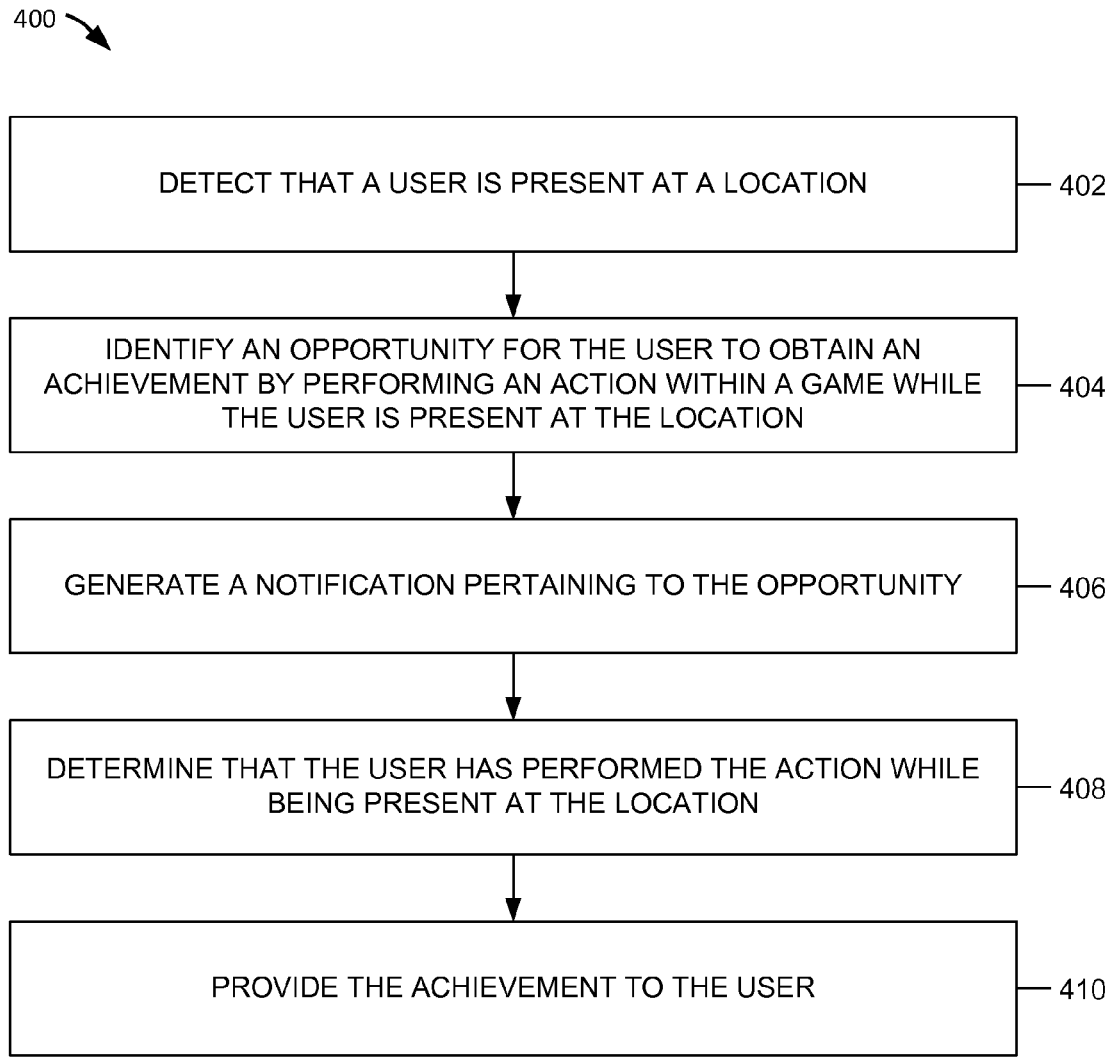
FIG. 4 is a flowchart illustrating an example method of generating a notification pertaining to an opportunity for a user to earn an achievement by performing an action within a game associated with a game networking system.

FIG. 4 is a flowchart illustrating an example method 400 of generating a notification pertaining to an opportunity for a user to earn an achievement by performing an action within a game associated with a game networking system (e.g., game networking system(s) 120b). In various embodiments, the method 400 may be implemented by the integration module 301 (FIG. 3).

At operation 402, the location module 302 detects that a user is present at a location. For example, the location module 302 receives GPS coordinates from a device of the user and maps them to a location (e.g., based on geographical maps, yellow pages, white pages, and so on). A location may be a region, such as a city, state, or country, a place of business, a home address, and so on. In various embodiments, the location module 302 may determine that a user is present at a particular business or other location by using location data received from the user or the user's device and mapping the location data to a business address or other address in a location database (e.g., a yellow pages database or white pages database). In various embodiments, the location may be a micro location (e.g., a precise location, such as a location within a store, such as a department or aisle within which a person is standing) or a macro location (a high-level location, such as a neighborhood, store, venue (e.g., park, sports arena, golf course), and so on. In various embodiments, the location might correspond generally to a type of location (e.g., one of a set of chain restaurants, such as McDonald's, Subway, or Starbucks).

At operation 404, the opportunity module 304 identifies an opportunity for the user to perform an action within a game associated with the game networking system in order to earn the achievement. For example, the opportunity module 304 accesses achievement data in an achievement database corresponding to the location of the user. In various embodiments, the achievement database may include records corresponding to achievements that may be earned by users of the game networking system. The records may include fields for the requirements for earning the achievement, a game (or multiple games) executing on the game networking system to which the achievement relates, and locations at which the achievement may be earned. In various embodiments, the may be required to perform an action within a particular game to earn the achievement. In various embodiments, the achievements are only available to be earned at particular locations (e.g., at McDonald's restaurants, at a particular address, and so on) and not elsewhere.

At operation 406, the notification module 306 generates a notification pertaining to the opportunity. For example, the notification module 306 generates a notification that includes information about achievements available for the user to earn while the user is at the location. The notification may then be communicated to the user (e.g., via the communication module 308).

At operation 408, the action module 310 determines that the user has performed an action required to earn an achievement. For example, the action module 310 detects that the user performed a particular action within a game executing on the game networking system while the user was present at a particular location. The action module 310 further determines that the action satisfies a requirement for earning the achievement.

At operation 410, based on a determination that all of the requirements for earning an achievement are met, the providing module 312 provides the achievement to the user. For example, the providing module 312 adds a graphical badge to an online profile of the user, the badge signifying that the user earned the achievement.

Figure 5:
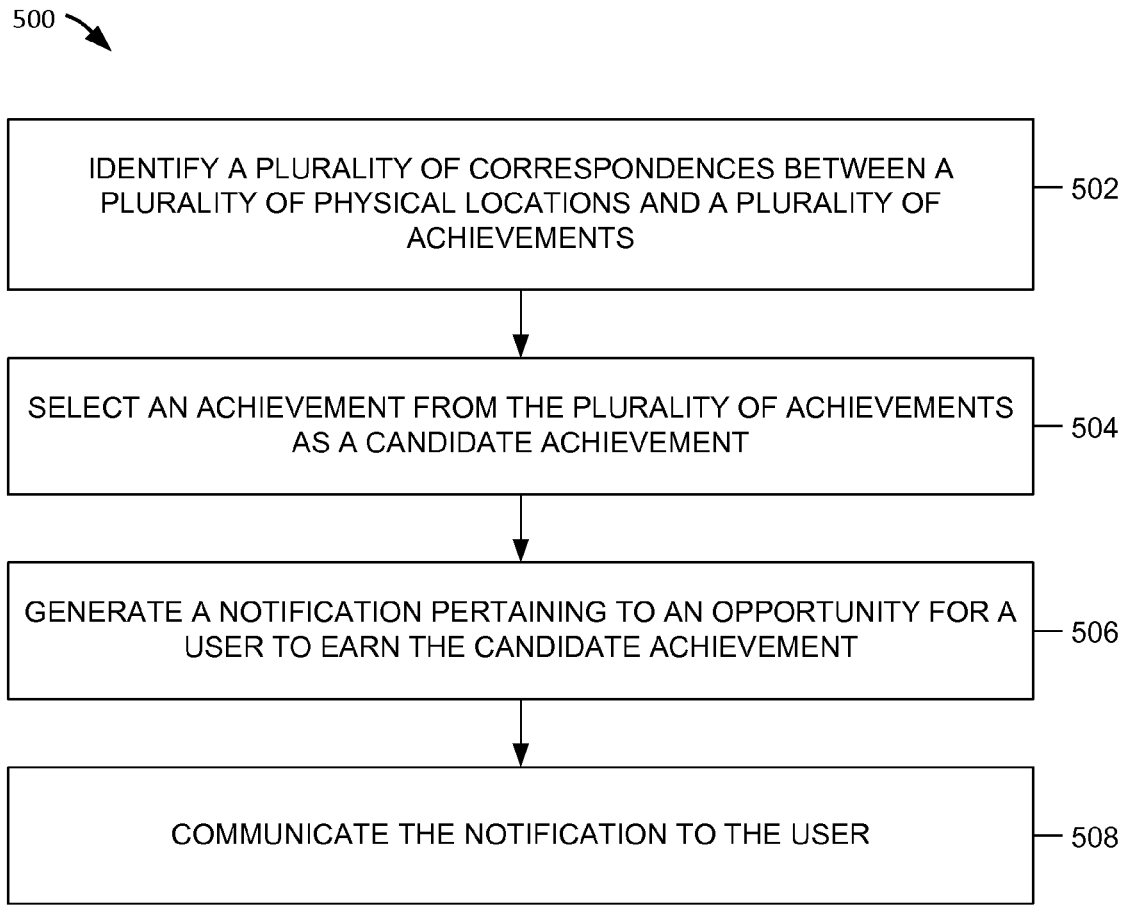
FIG. 5 is a flowchart illustrating an example method of generating and communicating a notification pertaining to selected opportunity for a user to earn an achievement.

FIG. 5 is a flowchart illustrating an example method 500 of generating and communicating a notification pertaining to selected opportunity for a user to earn an achievement. In various embodiments, the method 500 may be implemented by the integration module 301 (FIG. 3).

At operation 502, the correspondence module 314 identifies a plurality of correspondences between a plurality of physical locations and a plurality of achievements. In various embodiments, each of the achievements is associated with at least one of a plurality of games executing on the game networking system. For example, each of the achievements made be earnable by a user performing an action within one of the games.

At operation 504, an achievement is selected from the plurality of achievements as a candidate achievement. The achievement may be selected based on a combination of factors. Such factors may include, for example, the user's location, the user's activity level with respect to one or more games that the user participates in, a history of the user's activities with respect to the game networking system (e.g., while the user was at the location or a similar location), an importance or relevance of the achievement with respect to the user (e.g., whether the user has earned other related or similar achievements), activities of other users upon being presented with an opportunity to earn the achievement at the location, and so on.

At operation 506, the notification module 306 may generate a notification pertaining to an opportunity for the user to earn the candidate achievement. For example, the notification may include information pertaining to the achievement, such as how the user may earn the achievement. Additionally, the notification may include information about why the candidate achievement was selected for the user, such as an importance to the user of earning the badge (such as a notification that it is one of the last badges remaining for the player to earn an umbrella badge, described in more detail below), a relevance to the user based on actions that the user (or other users, such as friends of the user) performed in the past with respect to the game networking system while at the location.

At operation 508, the communication module 308 communicates the generated notification for presentation to the user on a device of the user.

Figure 6:
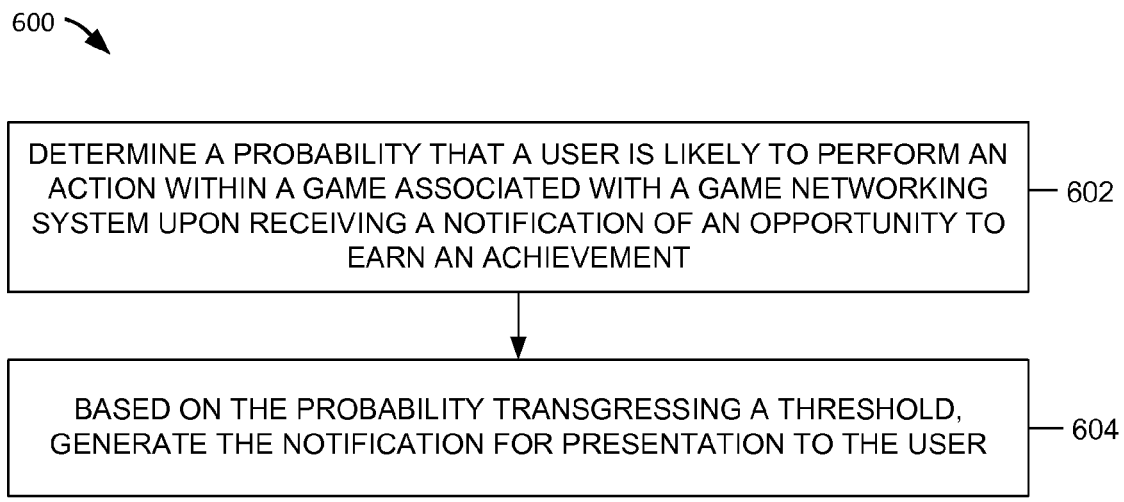
FIG. 6 is a flowchart illustrating an example method of generating a notification pertaining to an opportunity for a user to earn an achievement.

FIG. 6 is a flowchart illustrating an example method 600 of generating a notification pertaining to an opportunity for a user to earn an achievement. In various embodiments, the method 600 may be implemented by the integration module 301 (FIG. 3).

At operation 602, the measuring module 316 determines that a target user is likely to perform an action within a game associated with a game networking system upon receiving a notification of an opportunity to earn an achievement. The measuring module 316 may base the determination on various factors, such as a percentage of other users who performed the action after receiving the notification, a percentage number of times that the target user performed a similar action after receiving a similar notification, and so on.

In various embodiments, each of a plurality of candidate achievements are evaluated to determine the likelihood that presenting the player with the opportunity will result in the user increase a level of participation with respect to the game networking system while present at the location.

In various embodiments, each candidate opportunity is compared to a data set describing past user actions at the physical location in response to notifications provided. Thus, the measuring module may select a notification that is most appropriate for a particular location and time for presenting to the user. In various embodiments, the opportunity is selected based on an analysis of the ebb and flow of a player's participation with respect to the game networking system (or a game executing on the game networking system) at the location as well as the success of similar notifications sent to other users of the game networking system as increasing the participation of the other users while they are present at the physical location. For example, the measuring module may select an opportunity based on a determination that the user is typically not active with respect to the game networking system while present at the physical location and a determination that the opportunity was the most successful of the plurality of candidate opportunities at influencing other users with a similar history of lack of activity to become more active at the physical location.

At operation 604, based on the probability transgressing a threshold, the notification module 306 generates the notification for presentation to the user. Thus, the user may only receive notifications when they are likely to result in an action by the user.

Figure 7:
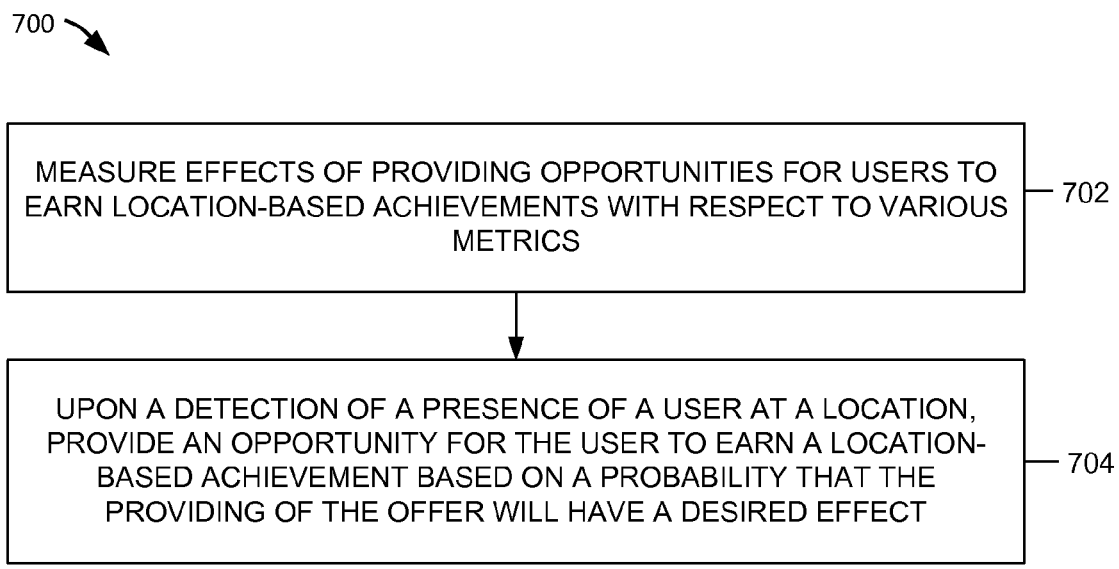
FIG. 7 is a flowchart illustrating an example method of providing a user with an opportunity to earn an achievement.

FIG. 7 is a flowchart illustrating an example method 700 of providing a user with an opportunity to earn an achievement. In various embodiments, the method 700 may be implemented by the integration module 301 (FIG. 3).

At operation 702, the measuring module 316 measures the effect of providing opportunities for users to earn location-based achievements. The measuring module 316 may measure the opportunities with respect to various metrics, such as the effect on a number of daily active users or an amount of revenues collected as a result of the opportunities being provided (e.g., in advertising fees or sales fees).

At operation 704, upon a detection of a user at a location and based on the measured effects, the notification module 308 may provide the user with an opportunity to earn a location-based achievement. For example, if the desired effect is to encourage participation of the user with respect to a game on the game networking system, and the measured effects suggest that other users had a higher level of participation in the game after being provided with the opportunity to earn a location-based achievement, the notification module 306 may notify the user of the opportunity to earn the location-based achievement. Similarly, if the desired effect is to collect additional revenues from the user, and the measured effects suggest that additional revenues were collected from other users when the other users were notified of the location-based achievement, the notification module 306 may notify the user of the opportunity to earn the location-based achievement.

Figure 8:
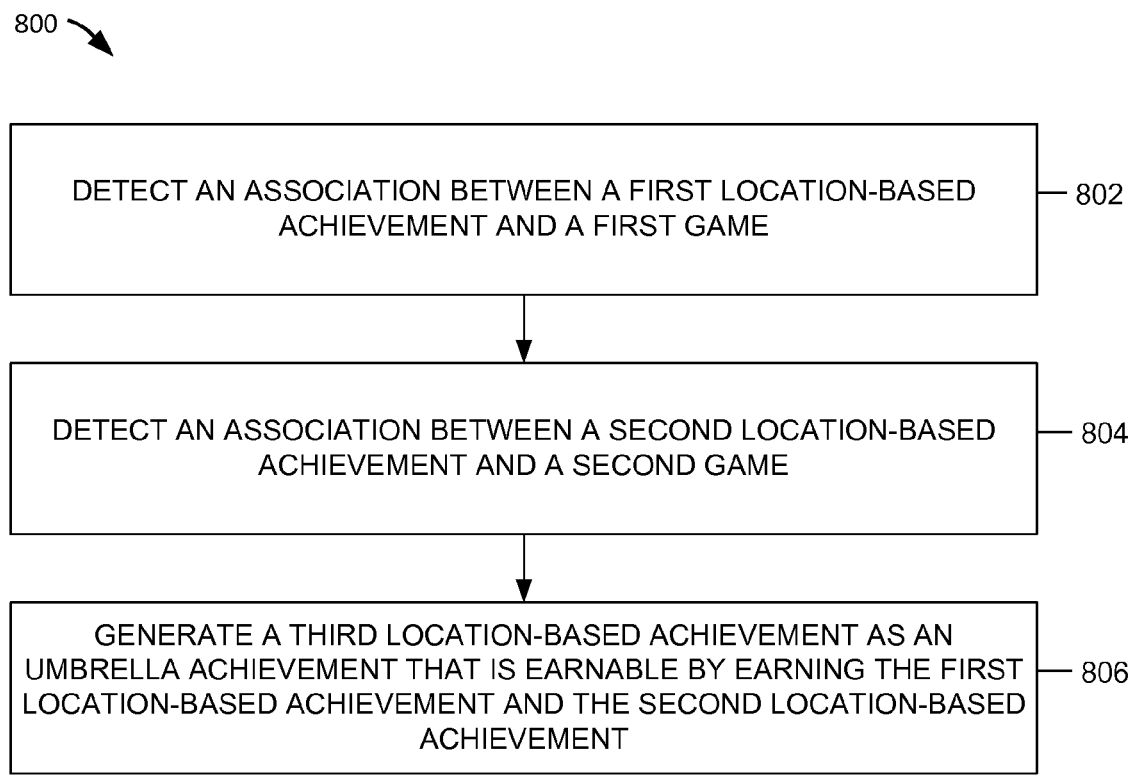
FIG. 8 is a flowchart illustrating an example method of generating and notifying a user of an opportunity to earn an umbrella achievement.

FIG. 8 is a flowchart illustrating an example method 800 of generating and notifying a user of an opportunity to earn an umbrella achievement. In various embodiments, the method 800 may be implemented by the integration module 301 (FIG. 3).

At operation 802, the correspondence module 314 detects an association between a first location-based achievement and a first game.

At operation 804, the correspondence module 314 detects an association between a second-location-based action and a second game.

At operation 806, the correspondence module 314 generates a third-location based achievement as an umbrella achievement. In various embodiments, the umbrella achievement may be earned by a user by completing the first location-based achievement and the second location-based achievement.

Thus, users may be incentivized to complete actions with respect to multiple games of the game networking system to earn one or more umbrella achievements associated with completing game-specific actions in each of at least two different games.

Although described separately, any of the operations of any of the methods described above may be combined in any compatible way. For example, one or more operations of the method 400 of generating a notification pertaining to an opportunity for a user to earn an achievement by performing an action within a game associated with a game networking system may be combined with one or more operations of the method 500 of generating and communicating a notification pertaining to selected opportunity for a user to earn an achievement, the method 600 of generating a notification pertaining to an opportunity for a user to earn an achievement, the method 700 of providing a user with an opportunity to earn an achievement, or the method 800 of generating and notifying a user of an opportunity to earn an umbrella achievement.

As an example, consider a game networking system on which multiple games are executing, including a simulation game, such as Zynga's Farmville, and a word game, such as Zynga's Words with Friends. While present at a particular physical location, such as the state of Montana, a user of the game-networking system may be notified of an opportunity to earn an achievement pertaining to perform an action within the simulation application (e.g., to farm crops within Farmville) while the user is present in Montana. This achievement may be selected for providing to the user based on various factors described above, such as a determination that the user (or one or more other users of the game networking system) has engaged with the simulation game at different locations in the past when provided with an opportunity to earn similar achievements. The achievement may not be available for the user to obtain outside of Montana. Thus, the user may have an incentive to perform one or more actions within the simulation game while the user is present at Montana.

As another example, consider the same game networking system in which the user is present at a toy store, such as Toys R Us. The user may be provided with an opportunity to earn an achievement based on the user employing a particular toy-related word in the word game while being present at the toy store.

In various embodiments, earning of an achievement may require a user to perform multiple actions within the game over a time period at a location. For example, the user may be required to play seven words per day in a word game over a period of time (e.g., a week of vacation) while the person is traveling abroad.

In various embodiments, such location-based achievement opportunities may be group together under umbrella achievements. For example, an achievement may be offered to the user based on the user completing necessary actions to earn an achievement in the word game in addition to completing necessary actions to earn an achievement in the simulation game while present at a location.

In various embodiments, the game networking system may maintain a leaderboard of achievements earned by users of the game networking system over a period of time. For example, players may be ranked based on total number of location-based achievements earned, number of location-based achievements earned at a particular location, and so on. Scores may be associated with each achievement (e.g., by an administrator of the game networking system). The leaderboards may keep track of all-time scores for users as well as scores over a period of time (e.g., a day or a week).

In various embodiments, the game networking system may provide an opportunity for a user to earn an achievement based on an analysis of the periods of time during each day in which a player is most active with respect to the game networking system. For example, if a user is usually not active between particular hours (e.g., 5-6 pm) each day, the user may be provided with opportunities to earn achievements during such least-active periods. In this way, achievements may be selected to provide an incentive for a user to be active with respect to the game networking system during time periods and at locations in which the user is least likely (based on history) to engage with the game networking system.

Game Interfaces

In various embodiments, a player 101 of a client system 130 can use a browser client (e.g., Firefox, Chrome, Internet Explorer, etc.) to access the online game over the Internet (or other suitable network). For example, a user interface may be automatically generated and presented to the user in response to the user visiting or accessing the game operator's website or a third-party's website from client system 130 with a browser client. Game networking system 120*b* can transmit data to client system 130, thereby allowing the client system 130 to display a user interface, which is typically some type of graphic user interface. For example, the webpage downloaded to client system 130 may include an embedded call that causes client system 130 to download an executable object, such as a Flash .SWF object, which executes on client system 130 and renders the game within the context of the webpage. Other interface types are possible, such as server-side rendering and the like. A user interface may be configured to receive signals from the player 101 via client system 130. For example, the player 101 can click on the user interface or enter commands from a keyboard or other suitable input device. The game engine can respond to these signals to allow game play. The display of user interface can change based on the output of the game engine, the input of the player 101, and other signals from game networking system 120*b* and client system 130.

The user interface can display various game components, such as the game environment, options available to the player 101 (e.g., in-game actions, preferences, settings, etc.), game results, and so forth. Some components of the user interface may be static, while others may be dynamic (e.g., changing with game play). The user may be able to interact with some components (e.g., player character, NPCs, virtual objects, etc.) and not interact with other components (e.g., the background of the virtual world, such as the virtual street or sidewalk). The user can engage in specific in-game actions or activities by providing input to the user interface. The user can also click on various user interface elements in user interface to activate various game options.

User interfaces presented to a user may encompass a variety of game types, including gambling games, role-playing games, puzzle games, and the like.

Data Flow

Figure 9:
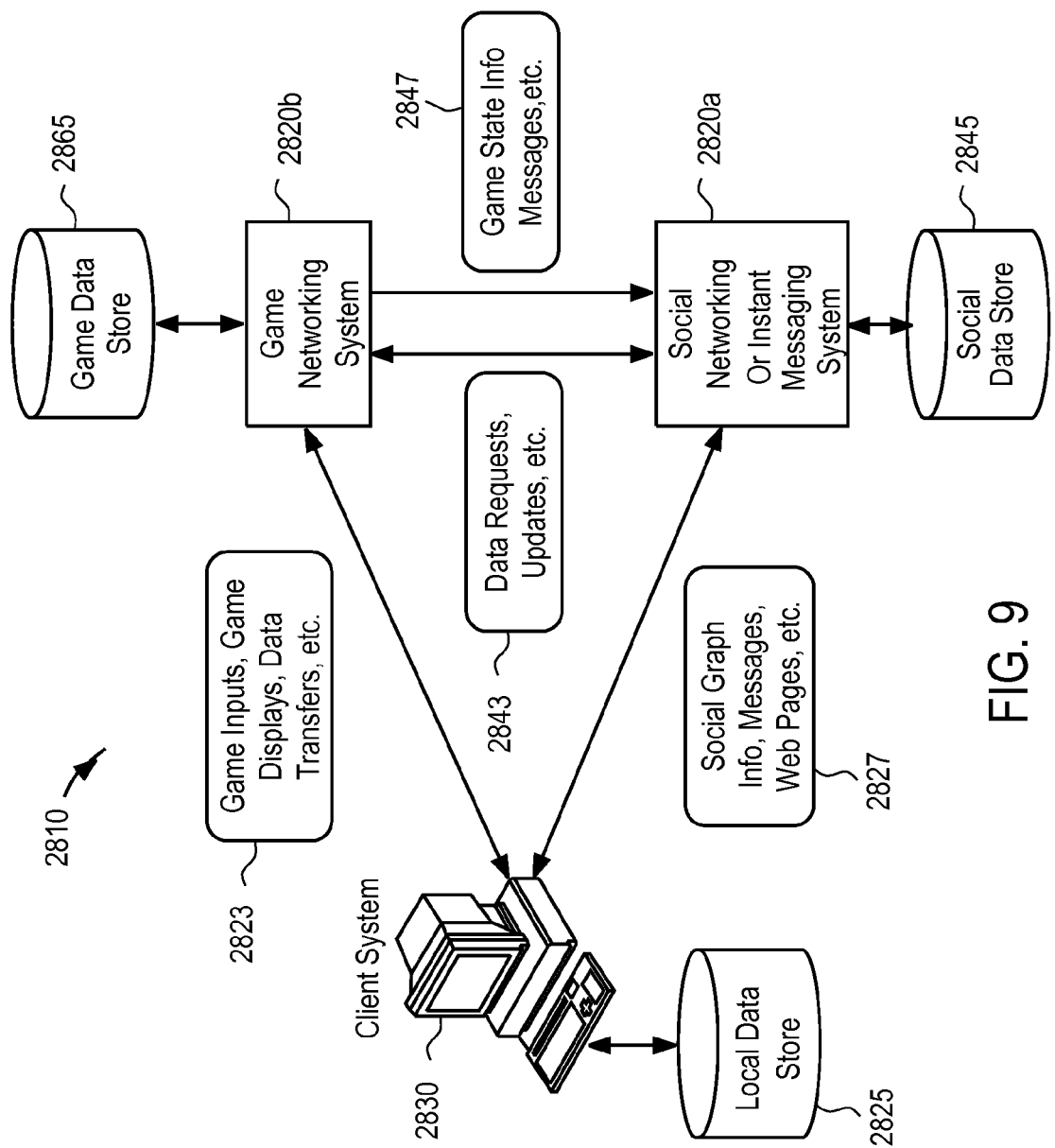
FIG. 9 is a block diagram illustrating an example data flow between the components of system.

FIG. 9 is a block diagram illustrating an example data flow between the components of system 2810. In particular embodiments, system 2810 can include client system 2830, social networking system 2820*a*, and game networking system 2820*b*. The components of system 2810 can be connected to each other in any suitable configuration, using any suitable type of connection. The components may be connected directly or over any suitable network. Client system 2830, social networking system 2820*a*, and game networking system 2820*b* can each have one or more corresponding data stores such as local data store 2825, social data store 2845, and game data store 2865, respectively. Social networking system 2820*a* and game networking system 2820*b* can also have one or more servers that can communicate with client system 2830 over an appropriate network. Social networking system 2820*a* and game networking system 2820*b* can have, for example, one or more internet servers for communicating with client system 2830 via the Internet. Similarly, social networking system 2820*a* and game networking system 2820*b* can have one or more mobile servers for communicating with client system 2830 via a mobile network (e.g., GSM, PCS, Wi-Fi, WPAN, etc.). In some embodiments, one server may be able to communicate with client system 2830 over both the Internet and a mobile network. In other embodiments, separate servers can be used.

Client system 2830 can receive and transmit data 2823 to and from game networking system 2820*b*. This data 2823 can include, for example, webpages, messages, game inputs, game displays, HTTP packets, data requests, transaction information, updates, and other suitable data. At some other time, or at the same time, game networking system 2820*b* can communicate data 2843, 2847 (e.g., game state information, game system account information, page info, messages, data requests, updates, etc.) with other networking systems, such as social networking system 2820*a* (e.g., Facebook, Myspace, etc.). Client system 2830 can also receive and transmit data 2827 to and from social networking system 2820*a*. This data 2827 can include, for example, webpages, messages, social graph information, social network displays, HTTP packets, data requests, transaction information, updates, and other suitable data.

Communication between client system 2830, social networking system 2820*a*, and game networking system 2820*b* can occur over any appropriate electronic communication medium or network using any suitable communications protocols. For example, client system 2830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HTML documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 2820b, the BLOB containing the game state for the instance corresponding to the player can be transmitted to client system 2830 for use by a client-side executed object to process. In particular embodiments, the client-side executable may be a Flash-based game, which can de-serialize the game state data in the BLOB. As a player plays the game, the game logic implemented at client system 2830 maintains and modifies the various game state parameters locally. The client-side game logic may also batch game events, such as mouse clicks, and transmit these events to game networking system 2820b. Game networking system 2820b may itself operate by retrieving a copy of the BLOB from a database or an intermediate memory cache (memcache) layer. Game networking system 2820b can also de-serialize the BLOB to resolve the game state parameters and execute its own game logic based on the events in the batch file of events transmitted by the client to synchronize the game state on the server side. Game networking system 2820b may then re-serialize the game state, now modified, into a BLOB and pass this to a memory cache layer for lazy updates to a persistent database.

With a client-server environment in which the online games may run, one server system, such as game networking system 2820b, may support multiple client systems 2830. At any given time, there may be multiple players at multiple client systems 2830 all playing the same online game. In practice, the number of players playing the same game at the same time may be very large. As the game progresses with each player, multiple players may provide different inputs to the online game at their respective client systems 2830, and multiple client systems 2830 may transmit multiple player inputs and/or game events to game networking system 2820b for further processing. In addition, multiple client systems 2830 may transmit other types of application data to game networking system 2820b.

In particular embodiments, a computer-implemented game may be a text-based or turn-based game implemented as a series of web pages that are generated after a player selects one or more actions to perform. The web pages may be displayed in a browser client executed on client system 2830. As an example and not by way of limitation, a client application downloaded to client system 2830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 2820a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 2830, either caused by an action of a game player or by the game logic itself, client system 2830 may need to inform game networking system 2820b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 2810 is discussed in reference to updating a multi-player online game hosted on a network-addressable system (such as, for example, social networking system 2820a or game networking system 2820b), where an instance of the online game is executed remotely on a client system 2830, which then transmits application event data to the hosting system such that the remote game server synchronizes the game state associated with the instance executed by the client system 2830.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 2830 may include a Flash client. The Flash client may be configured to receive and run Flash applications or game object codes from any suitable networking system (such as, for example, social networking system 2820a or game networking system 2820b). In particular embodiments, the Flash client may be run in a browser client executed on client system 2830. A player can interact with Flash objects using client system 2830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 2830, the Flash client may send the events that caused the game state changes to the in-game object to game networking system 2820b. However, to expedite the processing and hence the speed of the overall gaming experience, the Flash client may collect a batch of some number of events or updates into a batch file. The number of events or updates may be determined by the Flash client dynamically or determined by game networking system 2820b based on server loads or other factors. For example, client system 2830 may send a batch file to game networking system 2820b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 2830. In particular embodiments, the batch file may be a text file and the name-value pairs may be in string format.

In particular embodiments, when a player plays an online game on client system 2830, game networking system 2820b may serialize all the game-related data, including, for example and without limitation, game states, game events, and user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 2820b may retrieve the corresponding BLOB from the database to determine the most-recent values of the game-related data. In particular embodiments, while a player is playing the online game, game networking system 2820b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network-addressable resource or web site. Additionally, as used herein, a user may be an individual, a group, or an entity (such as a business or third-party application).

Figure 10:
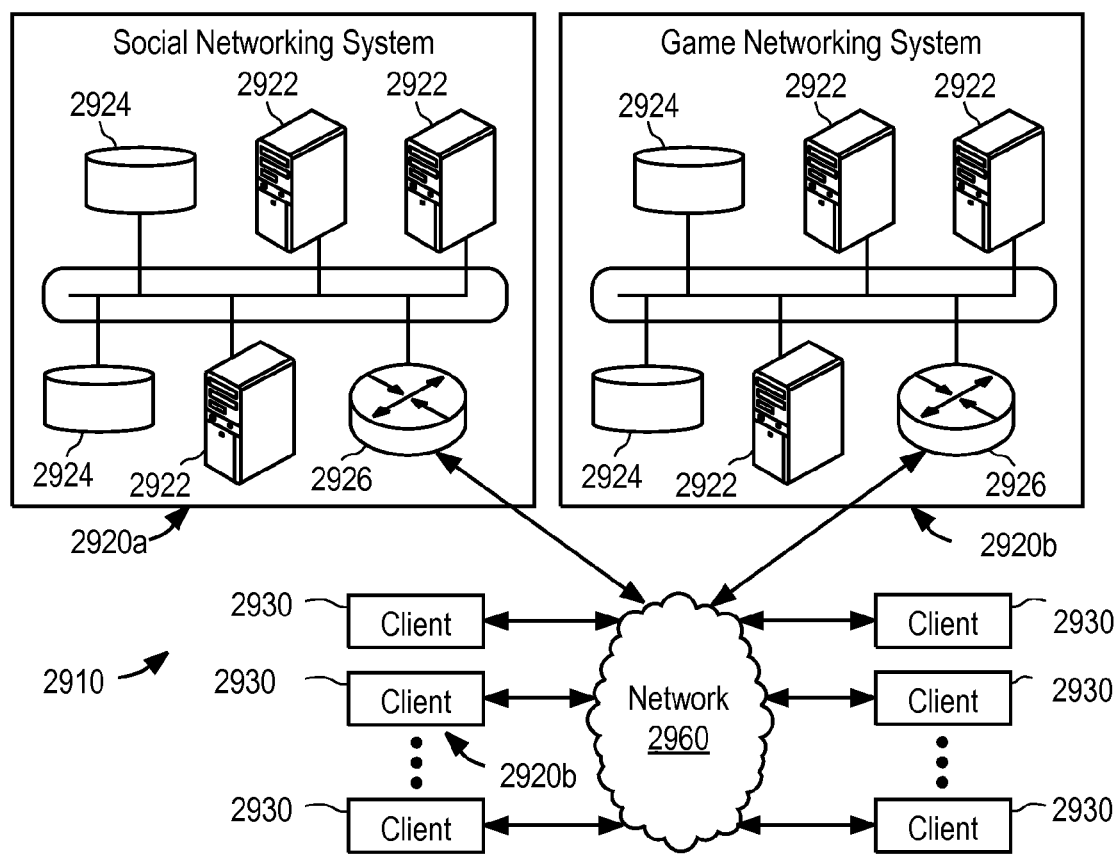
FIG. 10 is a block diagram illustrating an example network environment in which various example embodiments may operate.

Particular embodiments may operate in a wide area network environment, such as the Internet, including multiple network-addressable systems. FIG. 10 is a block diagram illustrating an example network environment 2910, in which various example embodiments may operate. Network cloud 2960 generally represents one or more interconnected networks, over which the systems and hosts described herein can communicate. Network cloud 2960 may include packet-based WANs (such as the Internet), private networks, wireless networks, satellite networks, cellular networks, paging networks, and the like. As FIG. 10 illustrates, particular embodiments may operate in a network environment 2910 comprising one or more networking systems, such as social networking system 2920a, game networking system 2920b, and one or more client systems 2930. The components of social networking system 2920a and game networking system 2920b operate analogously; as such, hereinafter they may be referred to simply as networking system 2920. Client systems 2930 are operably connected to the network environment 2910 via a network service provider, a wireless carrier, or any other suitable means.

Networking system 2920 is a network-addressable system that, in various example embodiments, comprises one or more physical servers 2922 and data stores 2924. The one or more physical servers 2922 are operably connected to network cloud 2960 via, by way of example, a set of routers and/or networking switches 2926. In an example embodiment, the functionality hosted by the one or more physical servers 2922 may include web or HTTP servers, FTP servers, application servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 2922 may host functionality directed to the operations of networking system 2920. Hereinafter, servers 2922 may be referred to as server 2922, although server 2922 may include numerous servers hosting, for example, networking system 2920, as well as other content distribution servers, data stores, and databases. Data store 2924 may store content and data relating to, and enabling, operation of networking system 2920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 2924 corresponds to one or more of a variety of separate and integrated databases, such as relational databases and object-oriented databases, that maintain information as an integrated collection of logically related records or files stored on one or more physical systems. Structurally, data store 2924 may generally include one or more of a large class of data storage and management systems. In particular embodiments, data store 2924 may be implemented by any suitable physical system(s) including components, such as one or more database servers, mass storage media, media library systems, storage area networks, data storage clouds, and the like. In one example embodiment, data store 2924 includes one or more servers, databases (e.g., MySQL), and/or data warehouses. Data store 2924 may include data associated with different networking system 2920 users and/or client systems 2930.

Client system 2930 is generally a computer or computing device including functionality for communicating (e.g., remotely) over a computer network. Client system 2930 may be a desktop computer, laptop computer, personal digital assistant (PDA), in- or out-of-car navigation system, smart phone or other cellular or mobile phone, or mobile gaming device, among other suitable computing devices. Client system 2930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 2930 to enter addresses of specific network resources to be retrieved, such as resources hosted by networking system 2920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 2930 desires to view a particular webpage (hereinafter also referred to as a target structured document) hosted by networking system 2920, the user's web browser, or other document rendering engine or suitable client application, formulates and transmits a request to networking system 2920. The request generally includes a URL or other document identifier as well as metadata or other information. By way of example, the request may include information identifying the user, such as a user identifier (ID), as well as information identifying or characterizing the web browser or operating system running on the user's client computing system 2930. The request may also include location information identifying a geographic location of the user's client system 2930 or a logical network location of the user's client system 2930. The request may also include a timestamp identifying when the request was transmitted.

Although the example network environment 2910 described above and illustrated in FIG. 10 is described with respect to social networking system 2920a and game networking system 2920b, this disclosure encompasses any suitable network environment using any suitable systems. As an example and not by way of limitation, the network environment may include online media systems, online reviewing systems, online search engines, online advertising systems, or any combination of two or more such systems.

Figure 11:
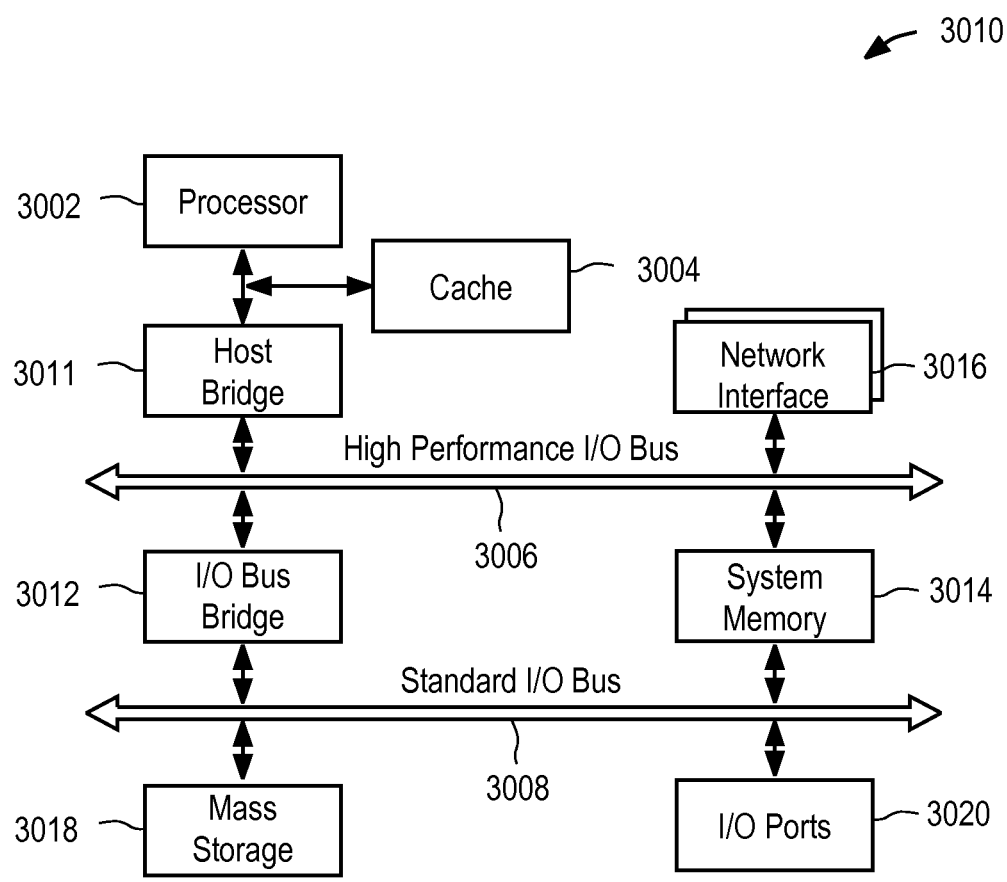
FIG. 11 is a block diagram illustrating an example computing system architecture, which may be used to implement a server or a client system.

FIG. 11 is a block diagram illustrating an example computing system architecture, which may be used to implement server 2922 or a client system 2930 of FIG. 10. In one embodiment, hardware system 3010 comprises a processor 3002, a cache memory 3004, and one or more executable modules and drivers, stored on a tangible computer-readable medium, directed to the functions described herein. Additionally, hardware system 3010 may include a high performance input/output (I/O) bus 3006 and a standard I/O bus 3008. A host bridge 3011 may couple processor 3002 to high performance I/O bus 3006, whereas I/O bus bridge 3012 couples the two buses 3006 and 3008 to each other. A system memory 3014 and one or more network/communication interfaces 3016 may couple to bus 3006. Hardware system 3010 may further include video memory (not shown) and a display device coupled to the video memory. Mass storage 3018 and I/O ports 3020 may couple to bus 3008. Hardware system 3010 may optionally include a keyboard, a pointing device, and a display device (not shown) coupled to bus 3008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 3010 are described in greater detail below. In particular, network interface 3016 provides communication between hardware system 3010 and any of a wide range of networks, such as an Ethernet (e.g., IEEE 802.3) network, a backplane, and so forth. Mass storage 3018 provides permanent storage for the data and programming instructions to perform the above-described functions implemented in servers 2922, whereas system memory 3014 (e.g., DRAM) provides temporary storage for the data and programming instructions when executed by processor 3002. I/O ports 3020 are one or more serial and/or parallel communication ports that provide communication between additional peripheral devices, which may be coupled to hardware system 3010.

Hardware system 3010 may include a variety of system architectures, and various components of hardware system 3010 may be rearranged. For example, cache memory 3004 may be on-chip with processor 3002. Alternatively, cache memory 3004 and processor 3002 may be packed together as a "processor module," with processor 3002 being referred to as the "processor core." Furthermore, certain embodiments of the present disclosure may not require nor include all of the above components. For example, the peripheral devices shown coupled to standard I/O bus 3008 may couple to high performance I/O bus 3006. In addition, in some embodiments, only a single bus may exist, with the components of hardware system 3010 being coupled to the single bus. Furthermore, hardware system 3010 may include additional components, such as additional processors, storage devices, or memories.

An operating system manages and controls the operation of hardware system 3010, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the terms "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

The invention claimed is:

1. A method comprising:
incorporating one or more modules into a game networking system, the one or more modules configuring one or more computer processors of the game networking system to perform operations to increase levels of participation of users of the game networking system, the operations comprising:
receiving an indication of a presence of a target user of a game networking system at a physical location;
identifying an opportunity for the target user to perform an action within a game associated with the game networking system to obtain an achievement pertaining to the game, wherein availability of the opportunity is triggered based on the presence of the user at the physical location, the opportunity selected from a plurality of candidate opportunities based on an analysis of activities of other users of the game networking system who performed actions with respect to the game networking system while present at the physical location, the analysis including determining a likelihood that the target user will increase a level of participation with respect to the game networking system while present at the location if presented with the opportunity is greater than a likelihood that the user will increase a level of participation with respect to the game networking system while present at the location if presented with another opportunity of the plurality of candidate opportunities; and
generating a notification pertaining to the opportunity for communication to the user.

2. The method of claim 1, wherein the game is one of a plurality of games associated with the game networking system, the achievement is one of a plurality of achievements associated with the plurality of games, and the achievement is selected based on a history of a plurality of actions of the user with respect to the plurality of games.

3. The method of claim 1, wherein the achievement is one of a plurality of achievements of an umbrella achievement that is earnable by the user earning each of the plurality of achievements.

4. The method of claim 1, further comprising communicating the notification based on an analysis of historical activity of the user at the physical location at a time of day of the presence of the user at the physical location.

5. The method of claim 1, wherein the game includes a harvesting mechanic and the opportunity includes performing a harvesting action that is relevant to the physical location to obtain the achievement.

6. The method of claim 1, wherein the game includes a word-playing mechanic and the opportunity includes playing a word that is relevant to the physical location to obtain the achievement.

7. A system comprising:
one or more computer processors;
one or more modules implemented by the one or more computer processors, the one or more modules configured to, at least:
receive an indication of a presence of a target user of a game networking system at a physical location;
identify an opportunity for the target user to perform an action within a game associated with the game networking system to obtain an achievement pertaining to the game, wherein availability of the opportunity is triggered based on the presence of the user at the physical location, the opportunity selected from a plurality of candidate opportunities based on an analysis of activities of other users of the game networking system who performed actions with respect to the game networking system while present at the physical location, the analysis including determining a likelihood that the target user will increase a level of participation with respect to the game networking system while present at the location if presented with the opportunity is greater than a likelihood that the user will increase a level of participation with respect to the game networking system while present at the location if presented with another opportunity of the plurality of candidate opportunities; and generate a notification pertaining to the opportunity for communication to the user.

8. The system of claim 7, wherein the game is one of a plurality of games associated with the game networking system, the achievement is one of a plurality of achievements associated with the plurality of games, and the achievement is selected based on a history of a plurality of actions of the user with respect to the plurality of games.

9. The system of claim 7, wherein the achievement is one of a plurality of achievements of an umbrella achievement that is earnable by the user earning each of the plurality of achievements.

10. The system of claim 7, wherein the one or more modules are further configured to communicate the notification based on an analysis of historical activity of the user at the physical location at a time of day of the presence of the user at the physical location.

11. The system of claim 7, wherein the game includes a harvesting mechanic and the opportunity includes performing a harvesting action that is relevant to the physical location to obtain the achievement.

12. The system of claim 7, wherein the game includes a word-playing mechanic and the opportunity includes playing a word that is relevant to the physical location to obtain the achievement.

13. A non-transitory machine-readable storage medium embodying a set of instructions that, when executed by at least one processor, causes the processor to perform operations, the operations comprising:

receiving an indication of a presence of a target user of a game networking system at a physical location;

identifying an opportunity for the target user to perform an action within a game associated with the game networking system to obtain an achievement pertaining to the game, wherein availability of the opportunity is triggered based on the presence of the user at the physical location, the opportunity selected from a plurality of candidate opportunities based on an analysis of activities of other users of the game networking system who performed actions with respect to the game networking system while present at the physical location, the analysis including determining a likelihood that the target user will increase a level of participation with respect to the game networking system while present at the location if presented with the opportunity is greater than a likelihood that the user will increase a level of participation with respect to the game networking system while present at the location if presented with another opportunity of the plurality of candidate opportunities; and generating a notification pertaining to the opportunity for communication to the user.

14. The non-transitory machine-readable storage medium of claim 13, wherein the game is one of a plurality of games associated with the game networking system, the achievement is one of a plurality of achievements associated with the plurality of games, and the achievement is selected based on a history of a plurality of actions of the user with respect to the plurality of games.

15. The non-transitory machine-readable storage medium of claim 13, wherein the achievement is one of a plurality of achievements of an umbrella achievement that is earnable by the user earning each of the plurality of achievements.

16. The non-transitory machine-readable storage medium of claim 13, the operations further comprising communicating the notification based on an analysis of historical activity of the user at the physical location at a time of day of the presence of the user at the physical location.

17. The non-transitory machine-readable storage medium of claim 13, wherein the game includes a harvesting mechanic and the opportunity includes performing a harvesting action that is relevant to the physical location to obtain the achievement.

* * * * *

UNITED STATES PATENT AND TRADEMARK OFFICE
CERTIFICATE OF CORRECTION

| | | |
|---|---|---|
| PATENT NO. | : 9,597,596 B2 | Page 1 of 1 |
| APPLICATION NO. | : 14/336516 | |
| DATED | : March 21, 2017 | |
| INVENTOR(S) | : Nishchaie Khanna | |

It is certified that error appears in the above-identified patent and that said Letters Patent is hereby corrected as shown below:

In the Specification

In Column 13, Line 53, delete "308" and insert --306-- therefor

Signed and Sealed this
Twenty-first Day of April, 2020

Andrei Iancu
*Director of the United States Patent and Trademark Office*